United States Patent
Zahlen et al.

(10) Patent No.: US 10,399,657 B2
(45) Date of Patent: Sep. 3, 2019

(54) FIBRE-REINFORCED METAL COMPONENT FOR AN AIRCRAFT OR SPACECRAFT AND PRODUCTION METHODS FOR FIBRE-REINFORCED METAL COMPONENTS

(71) Applicant: Airbus Operations GmbH, Hamburg (DE)

(72) Inventors: Pierre Zahlen, Hamburg (DE); Matthias Hegenbart, Hamburg (DE); Peter Linde, Hamburg (DE)

(73) Assignee: Airbus Operations GmbH (DE)

( * ) Notice: Subject to any disclaimer, the term of this patent is extended or adjusted under 35 U.S.C. 154(b) by 274 days.

(21) Appl. No.: 15/333,473

(22) Filed: Oct. 25, 2016

(65) Prior Publication Data

US 2017/0297674 A1    Oct. 19, 2017

(30) Foreign Application Priority Data

Oct. 28, 2015 (DE) .................. 10 2015 221 078

(51) Int. Cl.
*B22D 19/02* (2006.01)
*B64C 1/00* (2006.01)
(Continued)

(52) U.S. Cl.
CPC .............. *B64C 1/06* (2013.01); *B22D 19/02* (2013.01); *B22F 3/1055* (2013.01);
(Continued)

(58) Field of Classification Search
CPC .............. B22D 19/02; B23K 2203/14; B23K 2203/10; B23K 2203/172; B23K 2103/10;
(Continued)

(56) References Cited

U.S. PATENT DOCUMENTS 3,970,136 A * 7/1976 Cannell ................. B22D 19/14
164/108
4,818,633 A    4/1989 Dinwoodie et al.
(Continued)

FOREIGN PATENT DOCUMENTS

CN    86108354 A    6/1987
CN    103160760 A    6/2013
(Continued)

OTHER PUBLICATIONS

Lenntech, Carbon, accessed online Aug. 27, 2018.*
(Continued)

*Primary Examiner* — Camie S Thompson
(74) *Attorney, Agent, or Firm* — Lerner, David, Littenberg, Krumholz & Mentlik, LLP

(57) ABSTRACT

Production methods for producing a fiber-reinforced metal component having a metal matrix which is penetrated by a plurality of reinforcing fibers are provided. One method includes depositing in layers reinforcing fibers in fiber layers, depositing in layers and liquefying a metal modelling material in matrix material layers, and consolidating in layers the metal modelling material in adjacently deposited matrix material layers to form the metal matrix of the fiber-reinforced metal component. Here, the metal component is formed integrally from alternately deposited matrix material layers and fiber layers. An alternative method includes introducing an open three-dimensional fiberwoven fabric consisting of reinforcing fibers into a casting mold, pouring a liquid metal modelling material into the casting mold and consolidating the metal modelling material to form the metal matrix of the fiber-reinforced metal component. Here, the metal component is formed integrally from the consolidated metal modelling material and the reinforcing fibers.

9 Claims, 3 Drawing Sheets

(51) Int. Cl.

| | | |
|---|---|---|
| *B23K 101/00* | (2006.01) | |
| *B23K 103/14* | (2006.01) | |
| *B33Y 10/00* | (2015.01) | |
| *B64C 1/06* | (2006.01) | |
| *B23K 11/00* | (2006.01) | |
| *B23K 11/16* | (2006.01) | |
| *B23K 26/00* | (2014.01) | |
| *B23K 103/10* | (2006.01) | |
| *B22F 3/105* | (2006.01) | |
| *C22C 47/04* | (2006.01) | |
| *C22C 47/06* | (2006.01) | |
| *C22C 47/08* | (2006.01) | |
| *C22C 47/14* | (2006.01) | |
| *C22C 49/06* | (2006.01) | |
| *C22C 49/11* | (2006.01) | |
| *C22C 49/14* | (2006.01) | |
| *B33Y 80/00* | (2015.01) | |
| *B23K 26/342* | (2014.01) | |
| *B23K 103/16* | (2006.01) | |

(52) U.S. Cl.
CPC ........ *B23K 11/002* (2013.01); *B23K 11/0013* (2013.01); *B23K 11/16* (2013.01); *B23K 26/0006* (2013.01); *B23K 26/342* (2015.10); *B33Y 10/00* (2014.12); *B33Y 80/00* (2014.12); *C22C 47/04* (2013.01); *C22C 47/068* (2013.01); *C22C 47/08* (2013.01); *C22C 47/14* (2013.01); *C22C 49/06* (2013.01); *C22C 49/11* (2013.01); *C22C 49/14* (2013.01); *B22F 2999/00* (2013.01); *B23K 2101/006* (2018.08); *B23K 2103/10* (2018.08); *B23K 2103/14* (2018.08); *B23K 2103/172* (2018.08); *B64C 2001/0072* (2013.01); *Y02P 10/295* (2015.11)

(58) Field of Classification Search
CPC ............ B23K 2103/14; B23K 2103/17; C04B 2111/00931; C04B 35/80; C04B 41/4523; C04B 41/4578; C04B 41/51; C04B 41/88; C04B 41/009; C04B 41/52; B22F 3/18; C22C 49/06; C22C 49/11; C22C 49/14; C22C 49/04; C22C 1/1036; C22C 47/08; B64C 2001/0072; Y02P 10/295; H01L 31/0392; Y10T 428/12035; Y10T 428/12069; Y10T 428/12076; Y10T 428/12083; Y10T 428/12444
USPC ...... 164/108–112, 80, 97, 96; 264/241, 257, 264/258; 419/66, 24, 64, 35; 427/214; 428/539.5, 549, 554, 555, 556, 608; 501/127
See application file for complete search history.

(56) References Cited

U.S. PATENT DOCUMENTS

| | | | |
|---|---|---|---|
| 5,249,620 A | * | 10/1993 | Guerriero ............ B22D 19/14 164/101 |
| 5,260,137 A | | 11/1993 | Rosenthal et al. |
| 5,506,061 A | * | 4/1996 | Kindl ................. C04B 41/4584 264/241 |
| 6,064,031 A | | 5/2000 | Talwar |
| 6,144,008 A | | 11/2000 | Rabinovich |
| 6,197,411 B1 | | 3/2001 | Billaud et al. |
| 6,814,823 B1 | | 11/2004 | White |
| 7,005,598 B2 | | 2/2006 | Andrees et al. |
| 7,774,912 B2 | | 8/2010 | Gordon et al. |
| 2002/0019683 A1 | | 2/2002 | White et al. |
| 2005/0133123 A1 | | 6/2005 | Joseph et al. |

FOREIGN PATENT DOCUMENTS

| | | | |
|---|---|---|---|
| CN | 104 213 057 A | | 12/2014 |
| DE | 698 07 306 T2 | | 4/2003 |
| DE | 102 15 999 A1 | | 10/2003 |
| DE | 10 2012 011 264 A1 | | 12/2013 |
| EP | 0271222 | * | 6/1988 |
| EP | 1 798 301 A1 | | 6/2007 |

OTHER PUBLICATIONS

Lenntech, Aluminum, accessed online Aug. 27, 2018.*
CMP Tech Commentary, Electric Resistance Melting, 1988.*
Search Report dated Sep. 15, 2016 (DE 10 2015 221 078.2) (p. 2 categorizing cited art).

* cited by examiner

FIBRE-REINFORCED METAL COMPONENT FOR AN AIRCRAFT OR SPACECRAFT AND PRODUCTION METHODS FOR FIBRE-REINFORCED METAL COMPONENTS

FIELD OF THE INVENTION

The present invention relates to methods for automatically producing fibre-reinforced metal components, and also to fibre-reinforced metal components which are produced by methods of this type. The present invention is particularly concerned with metal components having integrated, reinforcing fibres for use in the aerospace industry.

Although fibre-reinforced metal components according to the present invention can be employed for many different uses, they and the problem addressed by the invention will be described in more detail with respect to passenger aircraft.

BACKGROUND OF THE INVENTION

In the field of modern aircraft construction, metal components are frequently used as structural components in composite construction. Thus, the skin of fuselage cells of aircraft is sometimes formed from glass fibre-reinforced aluminium ("Glass Laminate Aluminium Reinforced Epoxy", GLARE®), i.e. from a laminate assembly having alternating layers of aluminium and a glass-fibre laminate (glass fibre-reinforced plastics). Here, thin sheets of aluminium or of an aluminium alloy are superimposed in layers and are each joined together by an adhesive layer which has at least one resin-impregnated, unidirectional glass-fibre insert. Finally, the composite structure is cured using pressure and temperature to produce a sheet laminate. Improved damage tolerance and optimised impact behaviour, improved prevention of cracks spreading, effective corrosion resistance and low weight are sometimes stated as advantages of GLARE® and of other fibre-metal laminates of this type over monolithic metal components.

In addition to the use of such metal-laminate composites, it is also known to embed glass fibres in a metal matrix. Thus, for example U.S. Pat. No. 7,774,912B2 and US2005/0133123A1 describe methods for producing glass fibre-metal matrix composites which can be used in the aerospace sector. In these methods, glass fibre bundles are drawn through a bath of liquid metal, which is integrated into a melting furnace. Thereafter, the fibre bundles infiltrated with metal are brought into a desired arrangement by a die before they are finally cooled, i.e. cured.

In principle, it is common to all these methods that a plurality of complex, successive, sometimes even manual individual steps are required to manufacture the components. This lack of automation entails a significant manufacturing effort and corresponding production costs. For efficient small and large-scale manufacture, methods are required, using which it is possible to produce fibre-reinforced metal components with a reasonable amount of effort in an automated manner, which metal components would be impossible to produce, or could at least only be produced with a considerable amount of effort, by conventional methods.

BRIEF SUMMARY OF THE INVENTION

One of the ideas of the present invention is to find solutions for the efficient and economical production of fibre-reinforced metal components.

Accordingly, a first aspect of the invention pertains to a production method, a second aspect of the invention pertains to a further production method. Another aspect of the invention pertains to a metal component. Finally, a further aspect of the invention pertains to an aircraft or spacecraft.

Accordingly, a method for the production of a fibre-reinforced metal component is provided. The metal component has a metal matrix which is penetrated by a plurality of reinforcing fibres. The production method comprises depositing in layers reinforcing fibres in fibre layers, depositing in layers and liquefying a metal modelling material in matrix material layers, and consolidating in layers the metal modelling material in adjacently deposited matrix material layers to form the metal matrix of the fibre-reinforced metal component. The metal component is formed integrally from alternately deposited matrix material layers and fibre layers.

Alternatively, the production method comprises introducing an open three-dimensional fibrewoven fabric consisting of reinforcing fibres into a casting mould, pouring a liquid metal modelling material into the casting mould and consolidating the metal modelling material to form the metal matrix of the fibre-reinforced metal component. Here, the metal component is formed integrally from the consolidated metal modelling material and the reinforcing fibres.

Furthermore, a fibre-reinforced metal component is provided which is produced by the methods according to the invention.

Furthermore, an aircraft or spacecraft having a fibre-reinforced metal component according to an embodiment of the invention is provided.

One of the ideas of the present invention is to form three-dimensional components in a single, integrated, automated production process, in which reinforcing fibres are directly embedded in a metal matrix. In this context, "three-dimensional" means that in principle, solid metal components which have any desired form can be produced in one piece, in which reinforcing fibres consisting of different advantageous materials are embedded. In the methods according to the invention, the reinforcing fibres are positioned fully automatically in layered manufacture. On the one hand, the manufacturing effort and the production costs entailed thereby can be very significantly reduced by the integrated automated production according to the present invention. Thus, for example the curing process using an autoclave or the like, which process is usually essential in the case of fibre-metal laminates, is not required.

On the other hand, a considerable advantage of the solution according to an aspect of the invention is thus that solid metal components having flexibly arranged, integrated fibres can be produced economically and efficiently using relatively simple means. Metal-fibre composite components are conventionally made up of alternate layers of metal and fibre laminate layers which are joined together using epoxy resin and other binding materials. Here, particularly the fibre laminate layers typically comprise a matrix of synthetic resin. According to the methods of the present invention, reinforcing fibres, for example glass fibres, carbon fibres or the like are now directly embedded in a metal matrix, without using additional, fundamentally structurally weaker materials. The fibre-reinforced metal components according to an embodiment of the invention are thus distinguished from fibre-metal laminates by a high (tensile) strength and a high rigidity (i.e. a high modulus of elasticity). Basic disadvantages of a laminar structure, such as delamination, i.e. when individual layers become detached or tear off, are completely avoided. The high strength and the high modulus of elasticity of reinforcing fibres are directly and optimally incorporated into the strength and rigidity of the metal component which has been formed. Metal components according to the invention are multifunctional in the sense that fibres can be integrated into the metal components for different purposes. As in the case for metal components, fibres can be provided in a laminate-composite construction for reinforcing purposes or for other structure-improving purposes.

Advantageous embodiments and developments can be found in the description, with reference to the figures.

According to a development, depositing in layers and liquefying the metal modelling material can comprise depositing the metal modelling material in the form of a metal powder, a metal strip and/or a metal wire or the like.

Depositing in layers and liquefying the metal modelling material can comprise liquefying the metal modelling material using a laser. Accordingly, the metal modelling material can be melted by a laser, for example the modelling material can be deposited in the form of a powder or as a strip or wire and then melted by the laser. In this development, the production method can comprise, for example, a laser sintering method or a laser melting method or a similar method. In selective laser sintering (SLS) and selective laser melting (SLM), pulverulent materials are gradually applied in thin layers, then melted or sintered by a laser beam and then cured. Here, on cooling, the deposited material joins with previously applied material and cures, thereby forming an integral object. A person skilled in the art will infer from the context that other methods can also be used which provide similar results. For example, as an alternative to a laser method, the metal modelling material can also be liquefied using an electron beam, for example in the sense of electron beam melting (EBM) or electron beam sintering (EBS).

According to an alternative development, depositing in layers and liquefying the metal modelling material can comprise liquefying the metal modelling material by resistance melting. In this development, the electrical resistance of the metal modelling material is used to heat said material by introducing an electric current until it melts or liquefies.

For this purpose, the reinforcing fibres can be coated with or sheathed by a metal material or a metal alloy, for example copper, aluminium or another suitable material. In this advantageous development, the electric current for heating the metal modelling material can be introduced directly via the reinforcing fibres which have already been deposited. For example, the reinforcing fibres can be applied by two or more pressure rollers, suitable means being provided on the pressure rollers to transfer electric current onto the reinforcing fibres via the pressure rollers. The electrically conductive coating or sheathing of the reinforcing fibres transfer the current, as a result of which the reinforcing fibres and/or the metal modelling material which has already been deposited is heated. The metal modelling material liquefies and encases the deposited reinforcing fibres, thereby producing a solid metal component having embedded reinforcing fibres.

According to a development, depositing in layers and liquefying the metal modelling material can comprise extruding metal modelling material. Extrusion processes are another alternative, advantageous option of applying the metal modelling material in layers, which allows a particularly smooth and uniform application of metal layers. For example, the production method can comprise a fused deposition modelling method. Fused deposition modelling (FDM) includes methods in which material layers are deposited by extruding a heated free-flowing material. Here, on cooling, the deposited material joins with previously applied material and cures, thereby forming an integral object. Furthermore, in principle, further methods can be used which are known from 3D printing processes of metals, i.e. all generative and additive manufacturing methods, in which, on the basis of geometric models, objects of a predefined form are produced from formless materials, such as liquids and powders or neutral-form semi-finished products, such as strip-shaped or wire-shaped material, by means of chemical and/or physical processes in a specific generative manufacturing system.

According to a development, depositing the reinforcing fibres in layers can comprise feeding the reinforcing fibres from one or more fibre bundles. Furthermore, depositing the reinforcing fibres in layers can comprise depositing the reinforcing fibres by means of one or more pressure rollers. Depositing the reinforcing fibres in layers can also comprise fanning out the reinforcing fibres by means of a spreader roll of the like. For example, individual reinforcing fibres from one or more fibre bundles can be supplied by appropriate feed rollers, fanned out, distributed and arranged in a planar manner by means of a spreader roll or the like, and finally applied by means of a pressure roller. In this development, fibre layers consisting of a plurality of adjacently arranged reinforcing fibres can be applied in an efficient and precise manner.

According to a development, the average melting point of the reinforcing fibres can be above the average melting point of the metal modelling material. Accordingly, the metal modelling material and the material of the reinforcing fibres are advantageously adapted to one another so that the liquefaction of the metal modelling material does not affect the fibre layers of reinforcing fibres which have already been deposited.

According to a development, the metal modelling material can be selected from the group consisting of aluminium, titanium and an alloy thereof, or the like.

According to a development, the reinforcing fibres can be selected from the group consisting of glass fibres, carbon fibres, aramid fibres and boron fibres or the like. Thus, subject to use and requirements, different combinations of metal modelling material, i.e. the material of the metal matrix, and of reinforcing fibres can be used. For example, carbon fibres can be embedded in a metal matrix made of titanium or of a titanium alloy. This development would be particularly resistant to corrosion, for example. Furthermore, carbon fibres would be particularly resistant to the required melting temperatures of the metals. Thus, carbon fibres can easily withstand temperatures of above 3000° C., whereas titanium for example melts or cures within the region of 1700° C. In addition, carbon fibres have a particularly high tensile strength of up to more than 5000 MPa and a modulus of elasticity of up to more than 500 GPa. A metal component which is reinforced in this manner and has a metal matrix of titanium and carbon fibres embedded therein can achieve tensile strengths of the order of 1000 MPa and moduli of elasticity of approximately 50 GPa, subject to the arrangement and orientation of the reinforcing fibres. Alternatively however, for example glass fibres having an aluminium matrix or a titanium matrix or alloys thereof can also be combined. In principle, a person skilled in the art will discern from this further possible advantageous combinations of these and other materials.

According to a development, the fibre-reinforced metal component can be formed as a structural component for reinforcing the fuselage of an aircraft or spacecraft. Accordingly, the metal component can be formed, for example, as a stringer, a frame, a stringer segment or a frame segment or as a stringer coupling or a frame coupling or the like. In principle, according to the invention it is also possible to form the metal component as a skin field or as a portion of a skin field. In general, by using components of this type, it is possible to improve the structural characteristics of aircraft, for example with regard to rigidity and strength, but also with regard to damage tolerance and impact behaviour, etc.

The above embodiments and developments can be combined together in any desired expedient manner. Further possible embodiments, developments and implementations of the invention also include combinations, not explicitly mentioned, of features of the invention which have been previously described or are described in the following with regard to the embodiments. In particular, a person skilled in the art will also add individual aspects as improvements or additions to the particular basic form of the present invention.

BRIEF DESCRIPTION OF THE DRAWINGS

In the following, the present invention will be described in more detail on the basis of the embodiments presented in the schematic figures, in which:

FIG. 4 is a schematic perspective view of a device for carrying out a production method according to FIG. 3a;

FIG. 5a, 5b are a schematic perspective view and a schematic side view of a device for carrying out an alternative production method according to FIG. 3a.

The accompanying figures are to provide a greater understanding of the embodiments of the invention. They show embodiments and, together with the description, serve to explain principles and concepts of the invention. Other embodiments and many of the mentioned advantages will become apparent in view of the drawings. The elements of the drawings have not necessarily been shown true-to-scale relative to one another.

In the figures of the drawings, identical, functionally identical and identically operating elements, features and components have respectively been provided with the same reference signs, unless indicated otherwise.

DETAILED DESCRIPTION

Figure 1:
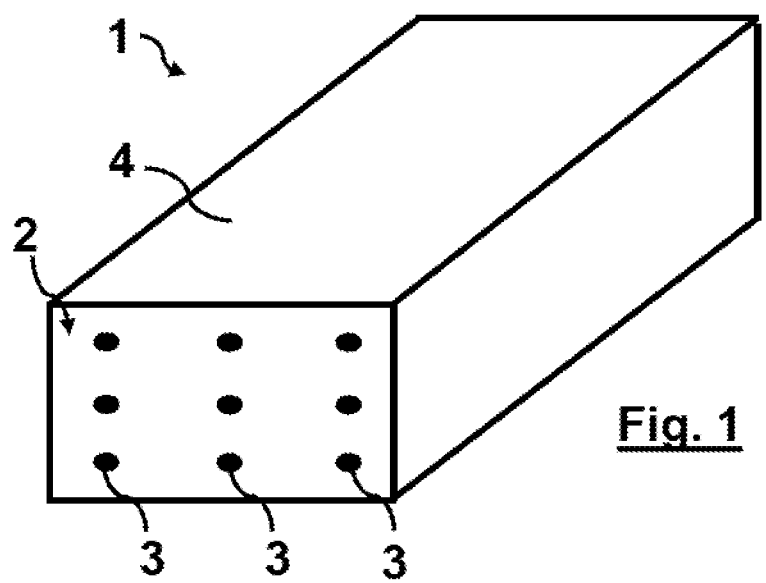
FIG. 1 is a schematic perspective view of a fibre-reinforced metal component according to an embodiment of the invention.

FIG. 1 is a schematic perspective view of a fibre-reinforced metal component according to one embodiment of the invention.

Figure 2:
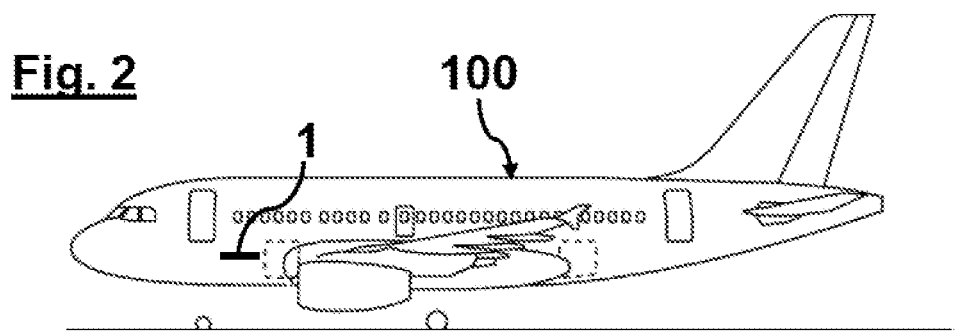
FIG. 2 is a schematic side view of an aircraft, into which the metal component from FIG. 1 is integrated.

In FIG. 1, reference numeral 1 denotes the fibre-reinforced metal component. The metal component 1 is a single piece, i.e. integral component having a metal matrix 2 consisting of a metal modelling material 4, for example titanium or aluminium or a corresponding alloy, through which pass a plurality of reinforcing fibres 3. The metal component 1 can be, for example, a structural component of an aircraft or spacecraft 100, for example a stringer or a frame. FIG. 2 is a schematic side view of an aircraft 100, into which the metal component 1 from FIG. 1 is integrated as a stringer. In principle, however, the present invention can be applied to any other metal components which can be provided for different purposes in an aircraft 100. In principle, a metal component 1 according to the present invention can also be a metal component of a composite component or the like. In this sense, the metal component 1 in FIG. 1 is to be considered as being purely schematic. For example, it can be formed as a stringer or frame having a cross section of any desired shape, i.e. for example a Z-, L- or Ω-shaped cross section.

The reinforcing fibres 3 in FIG. 1 can be, for example, carbon fibres or glass fibres which have been introduced into the metal component 1 in order to improve the structure thereof, for example to improve the damage tolerance of the metal component 1 under impacts or the like, or to improve the burn-through behaviour thereof. These reinforcing fibres 3 are arranged in parallel with one another in the longitudinal direction of the metal component 1. This arrangement is used merely for a schematic illustration. In principle, other arrangements can be advantageous in the sense of structure optimisation.

Figure 3A:
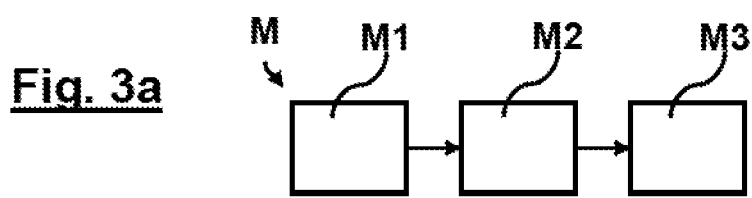
FIG. 3a, 3b are two schematic flow charts of methods for the production of the fibre-reinforced metal component from FIG. 1 according to further embodiments of the invention.

FIG. 3a is a schematic flow chart of a method M for the production of the fibre-reinforced metal component 1 from FIG. 1 according to a further embodiment of the invention.

The production method M in FIG. 3a comprises depositing in layers reinforcing fibres 3 in fibre layers 6 in step M1. Furthermore, the production method M comprises depositing in layers and liquefying a metal modelling material 4 in matrix material layers 5 in step M2. Furthermore, the production method M comprises, in step M3, consolidating in layers the metal modelling material 4 in the matrix modelling layers 5 to form the metal matrix 2 of the fibre-reinforced metal component 1. Here, the metal component 1 is formed integrally from alternately deposited matrix material layers 5 and fibre layers 6.

Figure 4:
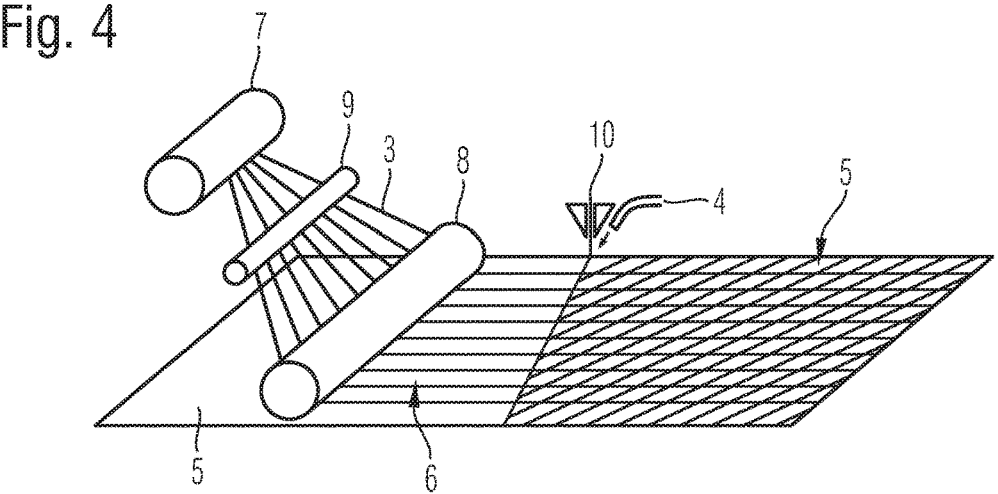
Figure 5A:
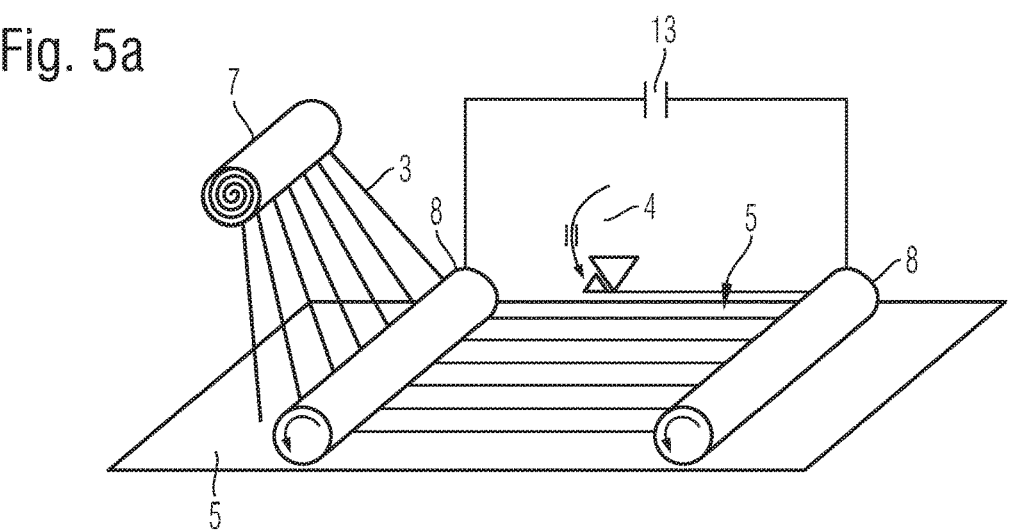
Figure 5B:
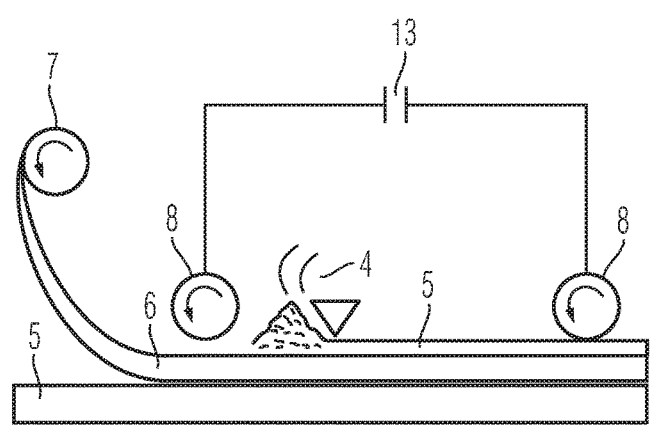

FIG. 4 is a schematic perspective view of a device for carrying out a possible production method M according to FIG. 3a. FIGS. 5a and 5b are a schematic perspective view and a schematic side view of a device for carrying out an alternative production method M according to FIG. 3a.

In FIG. 4, the individual reinforcing fibres 3 are supplied from one or more fibre bundles 7 by appropriate feed rollers. The reinforcing fibres 3 are then fanned out, distributed and arranged next to one another in a planar manner by a roll 9 or the like. Thereafter, the reinforcing fibres 3 are applied by a pressure roller 8 to a matrix material layer 5, which has already been applied, made of metal modelling material 4. A further matrix material layer 5 is then deposited on the fibre layer 6 of reinforcing fibres 3 deposited in this manner. For this purpose, a laying head (not shown in FIG. 4) has a feed for metal modelling material 4. In this embodiment, the metal modelling material 4 is provided in the form of a metal powder. The laying head also has a laser 10 which melts and liquefies the metal powder. As a result, the deposited metal modelling material 4 is consolidated with the matrix material layer 5 located under the fibre layer 6 by the liquefied metal modelling material 4 completely surrounding or embedding the reinforcing fibres 3 of the fibre layer 6. Two matrix material layers 5 are thus effectively fused, the metal matrix 2 formed thereby embedding a plurality of reinforcing fibres 3. The individual steps M1, M2, M3 of the production method M are repeated layer by layer. While so doing, the reinforcing fibres 3 can be arranged and/or oriented differently, for example. Likewise, the thicknesses of the individual layers, i.e. of the matrix material layer 5 and of the fibre layer 6, can be varied. In principle, the production method M makes it possible to manufacture and optimise a plurality of fibre-reinforced metal components 1 having different designs for different uses. Thus, the production method M manufactures, in a fully automatic manner, integral metal components from a solid metal matrix 2 which is penetrated by a plurality of reinforcing fibres 3.

The production method M shown schematically in FIGS. 5*a* and 5*b* basically comprises the same method steps M1, M2, M3 as that of FIG. 4. However, unlike FIG. 4, a laying head having a laser 10 is not provided here. Instead, the deposited metal powder is liquefied by resistance melting. For this purpose, two spaced-apart pressure rollers 8 are provided which press the reinforcing fibres 3 onto the underlying matrix metal layer 5. An electric circuit is then closed via the two pressure rollers 8 over a deposition surface located between the pressure rollers 8. For this purpose, the reinforcing fibres 3 can be coated with or sheathed by, for example, a metal material or a metal alloy. When electric current from a voltage source 13, connected to the pressure rollers 8, is then introduced into the deposition surface, the deposited metal powder of the metal modelling material 4 is then heated until it liquefies and surrounds the underlying fibre layer 6. Finally, the flow of current is interrupted so that the metal modelling material 4 cools down and solidifies, as a result of which it consolidates with the matrix material layer 5 located underneath the fibre layer 6. As in FIG. 4, this process provides an integral metal matrix 2 which completely surrounds or embeds the reinforcing fibres 3 of the fibre layer 6. These method steps M1, M2, M3 are then repeated for each layer of material until an integrally formed metal component 1 is produced which has a fibre-reinforced metal matrix 2.

Figure 3B:
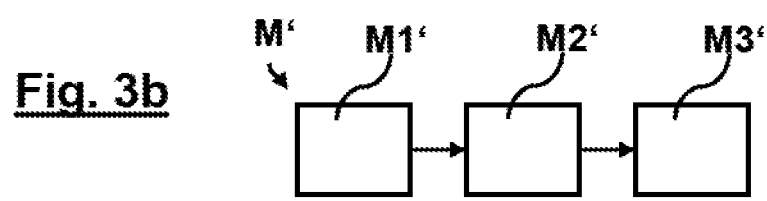

FIG. 3*b* is a schematic flow chart of an alternative method M' for the production of the fibre-reinforced metal component 1 from FIG. 1 according to a further embodiment of the invention.

This production method M' comprises, in step M1', introducing an open three-dimensional fibrewoven fabric 11, consisting of reinforcing fibres 3, into a casting mould 12. Furthermore, the production method M' comprises under M2' pouring a liquid metal modelling material 4 into the casting mould 12. Furthermore, the production method M' comprises under M3' consolidating the metal modelling material 4 in order to form the metal matrix 2 of the fibre-reinforced metal component 1. In so doing, the metal component 1 is formed integrally from the consolidated metal modelling material 4 and the reinforcing fibres 3.

Figure 6:
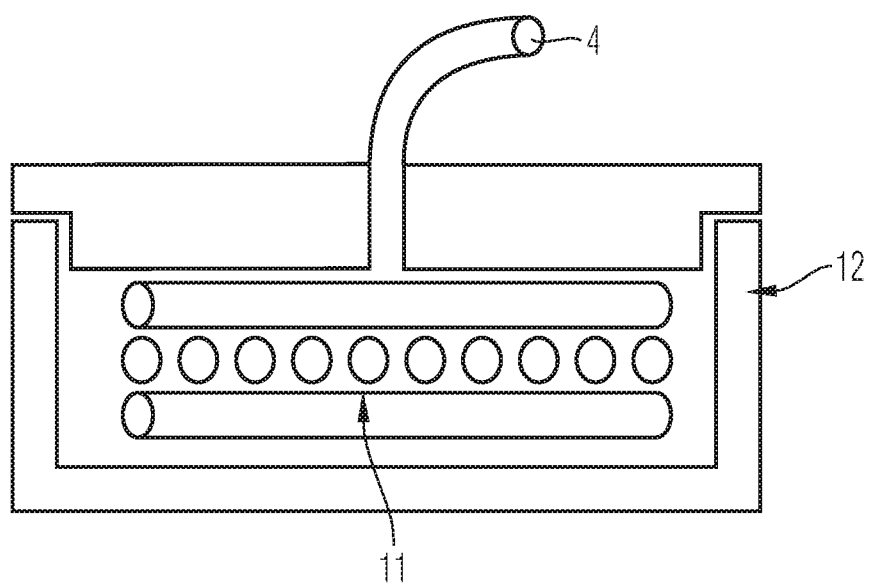
FIG. 6 is a schematic perspective view of a device for carrying out a production method according to FIG. 3b.

FIG. 6 is a schematic perspective view of a device for carrying out a production method M' according to FIG. 3*b*.

In this embodiment, the production method M' is fundamentally similar to the transfer moulding of plastics mouldings, for example of epoxy resin mouldings ("resin transfer moulding", RTM). A three-dimensional fibrewoven fabric 11 is located inside a casting mould 12. This fibrewoven fabric can have, for example, a layered structure made up of individual unidirectional fibre layers 6. However, in principle, more complex three-dimensional arrangements of reinforcing fibres 3 are also provided, in which the reinforcing fibres 3 can run in different directions outside a layer plane, too. The fibrewoven fabric 11 is formed in an open manner such that metal modelling material 4 which has been introduced into the casting mould 12 can completely surround and embed the reinforcing fibres 3, i.e. it can penetrate to some extent between the reinforcing fibres 3 of the fibrewoven fabric 11. After introducing M1' the fibrewoven fabric 11 into the casting mould 12, the mould is closed. The metal modelling material 4 is then liquefied and subsequently injected via one or more distributer channels into the interior of the casting mould 12, or is introduced in some other way, and is distributed therein. After consolidating M3' and cooling the metal modelling material 4, the metal component 1 which has formed can be removed from the casting mould 12. Alternatively, other production methods M' can also be used here which are known from processing plastics mouldings, for example compression moulding processes or the like ("resin compression moulding").

The described methods can be used in all areas of the transport industry, for example for road vehicles, rail vehicles or for watercraft, but also generally in engineering and in mechanical engineering or in other sectors, for example in architecture, in structural and civil engineering, etc. Moreover, in principle, the described production methods can not only be used for fibre-reinforced metal components, but also for fibre-reinforced plastics components, for example plastics components reinforced with aramid fibres. Furthermore, some of the described methods are also suitable for repairing or reinforcing ready-formed fibre-reinforced metal components. For example, additional layers made up of reinforcing fibres and metal can be applied for "on site" repairs to damaged metal components, for example to prolong the service life of fibre-reinforced metal components, which additional layers are joined integrally with the metal components.

In the preceding detailed description, different features have been combined in one or more examples to improve the stringency of the description. However, in this respect, it should be clear that the above description is merely of an illustrative nature, and is in no way restrictive. It serves to cover all alternatives, modifications and equivalents of the different features and embodiments. In view of the above description, many other examples will become immediately and directly apparent to a person skilled in the art based on his specialist knowledge.

The embodiments have been selected and described in order to be able to present the fundamental principles of the invention and the possibilities of use thereof in practice in the best possible way. As a result, experts can optimally modify and use the invention and the different embodiments thereof in respect of the intended use. In the claims and the description, the terms "containing" and "having" are used as linguistically neutral concepts for the corresponding term "comprising". Furthermore, the use of the terms "a", "an" and "one" does not in principle exclude a plurality of features and components described in this manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A production method for producing a fibre-reinforced metal component having a metal matrix which is penetrated by a plurality of reinforcing fibres, wherein the production method comprises:

depositing in layers reinforcing fibres in fibre layers, the reinforcing fibres being coated with or sheathed by a metal material or with a metal alloy;

depositing in layers and liquefying a metal modelling material in matrix material layers, wherein the layered deposition and liquefaction of the metal modelling material comprises liquefying the metal modelling material by resistance melting, wherein the liquefying the metal modelling material includes introducing an electric current into the coating or sheathing of the metal material or the metal alloy of the reinforcing fibres; and consolidating in layers the metal modelling material in adjacently deposited matrix material layers to form the metal matrix of the fibre-reinforced metal component, wherein the depositings of reinforcing fibres and metal modelling material and the consolidating are repeated layer by layer;

wherein the metal component is formed integrally from alternately deposited matrix material layers and fibre layers.

2. The production method according to claim 1, wherein the layered deposition and liquefaction of the metal modelling material comprises depositing the metal modelling material in the form of at least one of a metal powder, a metal strip and a metal wire.

3. The production method according to claim 1, wherein the layered deposition and liquefaction of the metal modelling material comprises extruding metal modelling material.

4. The production method according to claim 1, wherein the layered deposition of the reinforcing fibres comprises feeding the reinforcing fibres from one or more fibre bundles and depositing the reinforcing fibres by one or more pressure rollers.

5. The production method according to claim 4, wherein the layered deposition of the reinforcing fibres further comprises fanning out the reinforcing fibres by a spreader roll.

6. The production method according to claim 1, wherein the average melting point of the reinforcing fibres is above the average melting point of the metal modelling material.

7. The production method according to claim 1, wherein the metal modelling material is selected from the group consisting of aluminium, titanium and an alloy thereof.

8. The production method according to claim 1, wherein the reinforcing fibres are selected from the group consisting of glass fibres, carbon fibres, aramid fibres and boron fibres.

9. The product method according to claim 1, wherein the electric current is introduced through first and second pressure rollers spaced apart from one another.

* * * * *